United States Patent [19]

Kaldis et al.

[11] Patent Number: 5,032,569
[45] Date of Patent: Jul. 16, 1991

[54] CERAMIC HIGH TEMPERATURE SUPERCONDUCTOR IN BULK FORM, AND METHOD OF MANUFACTURING THE SAME

[75] Inventors: Emanuel Kaldis, Affoltern; Janusz Karpinski, Rudolfstetten, both of Switzerland

[73] Assignee: Asea Brown Boveri Ltd., Baden, Switzerland

[21] Appl. No.: 406,567

[22] Filed: Sep. 13, 1989

[30] Foreign Application Priority Data

Sep. 13, 1988 [CH] Switzerland ............ 3415/88

[51] Int. Cl.$^5$ .............. H01B 12/00; H01L 39/12
[52] U.S. Cl. .................. 505/1; 501/126; 501/152
[58] Field of Search ................. 505/779, 1

[56] References Cited

PUBLICATIONS

Morris et al., "Eight New High-Temperature Superconductor with the 1:2:4 Structure", Physical Rev. B: vol. 39, #10, Apr. 1, 1989.
Hazen et al., "Crystal Structure of DyBa$_2$Cu$_4$O$_8$: A New 77K Bulk Superconductor", Appl. Phys. Lett., 54(11), pp. 1057–1059, Mar. 13, 1989.
Appl. Phys. Lett. (1988), vol. 52, pp. 1831–1833, "Improved Press Forging of Ba$_2$YCu$_3$O$_x$ Superconductor", Grader et al.
Japanese Journal of Applied Physics (1988), vol. 27, pp. L622–L624, "High-J$_C$ Superconducting Single Crystalline HoBaCuO Thin Films by . . . ", Tanaka et al.
Nature, vol. 334, Jul. 14, 1988, P. Marsh et al, "Crystal Structure of the 80K Superconductor YBa$_2$Cu$_4$O$_8$," pp. 141–143.

Primary Examiner—William R. Dixon, Jr.
Assistant Examiner—Melissa Bonner
Attorney, Agent, or Firm—Oblon, Spivak, McClelland, Maier & Neustadt

[57] ABSTRACT

A novel ceramic high temperature superconductor which has at least one phase with the composition (SE)-Ba$_2$Cu$_{4-x}$O$_{8\pm y}$, where SE is a trivalent rare earth atom, $x \leq 0.5$, and $y \leq 1$. The novel superconductor is distinguished by high thermal stability. Where the rare earth atom is Y (yttrium), if $x=0$ and $y=0.01$ a ceramic is produced which is stable up to about 800° C., and has a transition temperature of 80° K.

5 Claims, 1 Drawing Sheet

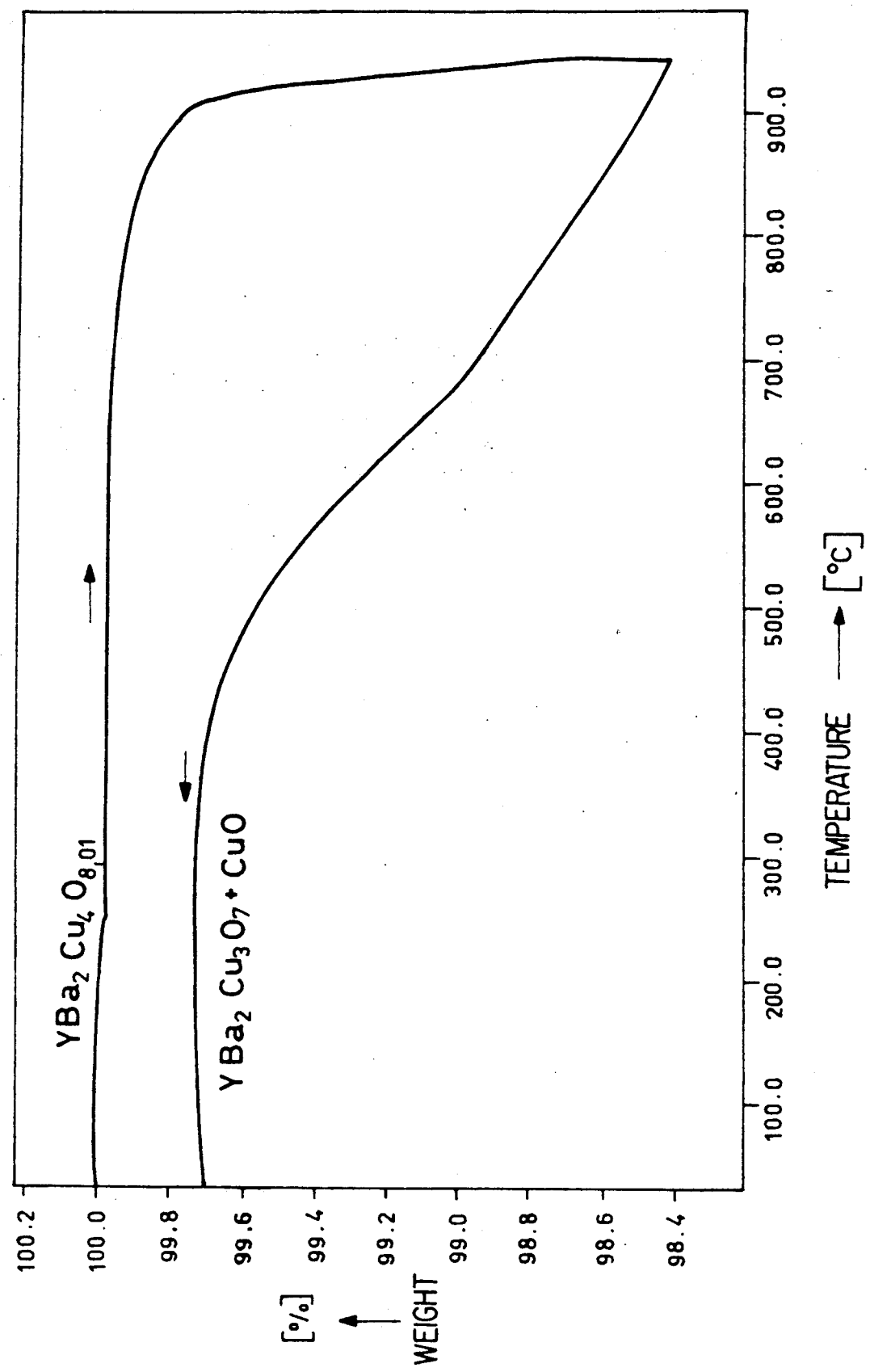

CERAMIC HIGH TEMPERATURE SUPERCONDUCTOR IN BULK FORM, AND METHOD OF MANUFACTURING THE SAME

BACKGROUND OF THE INVENTION

1. Field of the Invention

The invention relates to the area of high temperature superconductors, in particular to a ceramic high temperature superconductor in bulk form, and a method of manufacturing same.

2. Discussion of the Background

Recently there has been an unprecedented intensification of the development of superconductors, due to the discovery of high temperature superconduction in ceramics of the La-Ba-Cu-O system, leading to the development of a series of ceramics with increasing critical temperatures.

Some of these known novel ceramics can be produced in bulk form; others only in the form of thin layers. For applications in electrical engineering, it is important to have a superconductor in the bulk form.

Substantial known research in the art has been devoted also to the system Y-Ba-Cu-O. One material of this type, the oxide $YBa_2Cu_3O_{7-\delta}$, which is known under the designation "1-2-3 compound", is distinguished by a critical temperature $T_c$ of about 90° K. and may be produced in bulk form relatively easily. Accordingly it is of particular interest for the intended superconductors.

However, the "1-2-3 compound" presents the problem that the oxygen in the material is not thermally stabile. At a few hundred ° C. there are undesired structural changes, resulting in breakdown of the ceramic material and modification of the superconducting properties of the material.

SUMMARY OF THE INVENTION

One object of the invention is to provide a ceramic high temperature superconductor which is distinguished by its thermal stability at relatively high temperatures; and to provide a method of manufacturing this superconductor material.

This and other objects which will become apparent from the following specification have been achieved by a superconductor of the type described initially above; in that:

(a) The material contains essentially one or more phases of controlled composition; and (b) One of these phases has the composition $(SE)Ba_2Cu_{4-x}O_{8\pm y}$ where SE is a trivalent rare earth atom, $x \leq 0.5$, and $y \leq 1$.

The inventive manufacturing method is distinguished by the following steps:

(a) $(SE)Ba_2Cu_3O_{7-\delta}$ and CuO are mixed in powder form and are then pressed into the desired shape; and (b) The pressed piece is sintered under an oxygen pressure at elevated temperature.

According to a one preferred embodiment of the invention, SE is an yttrium atom. According to a second preferred embodiment of the invention, x=zero and y is close to zero.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein:

The Figure shows the results of a thermogravimetric measurement on a bulk ceramic of composition $YBa_2Cu_4O_{8.01}$.

DETAILED DESCRIPTION OF THE PREFERRED EMBODIMENTS

It has been discovered that under certain conditions, defects can occur in bulk ceramics of the "1-2-3 compound", $YBa_2Cu_3O_7$, which defects were initially interpreted in the literature as additional Cu atom sites within the known structure of the "1-2-3 compound" (see Zandbergen, H. W., et al., 1988, Nature, 331:596-599).

Subsequent studies of vapor-deposited thin layers have shown that a second phase exists in the Y-Ba-Cu-O system in addition to the known "1-2-3" phase. The stoichiometry of this second phase may be described as $YBa_2Cu_4O_8$; the corresponding critical temperature is 80° K., which is below the $T_c$ of the "1-2-3" phase (Marsh, P., et al., 1988, Nature, 334:141-143).

The proportion of this new phase in the thin layers has been stated to be 85%. Thus the new phase has not been found in either pure form or in bulk form. Further, there are no reported data on the thermal stability of the new phase.

It has been found, in connection with the present invention, that the new phase can be produced as a bulk material as a stoichiometric composition or in a composition deviating from stoichiometric composition. Further, it has been discovered that this bulk material displays thermal stability of the oxygen which stability is clearly superior to that of the known "1-2-3 compound".

The increased thermal stability is attributed to the presence of Cu-O double bonds in the crystal structure of the new phase. For this reason it is also conceivable that the yttrium atoms in the unit cell may be replaceable by other rare earth atoms SE of the same valence.

In general the inventive bulk superconductor is essentially comprised of one or more phases of a controlled composition. One of these phases has the composition $(SE)Ba_2Cu_{4-x}O_{8\pm y}$, where SE is a trivalent rare earth atom, $x \leq 0.5$, and $y \leq 1$.

According to a preferred embodiment of the invention, SE is an yttrium atom, x=0, and y is close to zero. According to another embodiment, x is close to 0.5.

The present method for preparing the superconducting compounds begins with two oxide components one of which has the composition $(SE)Ba_2Cu_3O_{7-\delta}$ analogous to the "1-2-3 compound", and the other of which comprises CuO. Here the parameter delta ($\delta$) is preferably in the range between 0.02 and 0.05.

Both components are pulverized by an appropriate process, which is per se known. They are intermixed, and are pressed into the desired form. The pressed material is then subjected to a sintering process under an oxygen pressure (preferably greater than $5 \times 10^6$ Pa) and at high temperatures (preferably about 1000° C.).

The product is a thermally stable bulk superconductor which has a stoichiometric (1-2-4) or nonstoichiometric (e.g. 1-2-3.5) composition depending on the mixture ratio of the two components (namely, depending on whether the ratio is stoichiometric or not).

Other features of the invention will become apparent in the course of the following descriptions of exemplary embodiments which are given for illustration of the invention and are not intended to be limiting thereof.

EXAMPLES

Example

To manufacture a bulk superconductor, several grams of the components $YBa_2Cu_3O_{7-\delta}$ (with delta=0.02 to 0.05) and CuO were pulverized in customary fashion, were mixed in a stoichiometric ratio, and were pressed. The pressed piece was then heated to about 1000° C. at a rate of about 5°/min in an autoclave in pure oxygen atmosphere at about $4 \times 10^7$ Pa. The piece was held at this temperature 20 hr and was then cooled back down at a rate of about 2°/min. The resulting bulk superconductor had a measured composition of $YBa_2Cu_4O_{8.01}$ and a critical temperature of 80° K.

For testing the thermal stability of a bulk superconductor manufactured by this method the superconductor was studied by thermogravimetry. The results are reported in the form of a curve (see Figure) wherein the weight of the sample studied (in weight percent) is plotted as a function of temperature, for heating (upper curve part) and subsequent cooling (lower curve part) in an oxygen atmosphere at $10^5$ Pa.

The upper curve part shows clearly that for a bulk ceramic with the composition $YBa_2Cu_4O_{8.01}$, appreciable instability does not set in until the temperature is raised to about 800° C.

The lower curve part shows the thermogravimetric behavior of the system $YBa_2Cu_3O_7 + CuO$.

The invention provides a ceramic high temperature superconductor in bulk form which is relatively easy to manufacture and is distinguished by high thermal stability and a high critical temperature.

Obviously, numerous modifications and variations of the present invention are possible in light of the above teachings. It is therefore to be understood that within the scope of the appended claims, the invention may be practiced otherwise than as specifically described herein.

What is claimed is:

1. A method of manufacturing a ceramic high temperature superconductor in bulk form having at least one phase, said phase having the composition $$(SE)Ba_2Cu_{4-x}O_{8 \pm y}$$

wherein SE is a trivalent rare earth atom, $x \leq 0.5$, and $y \leq 1$, comprising the steps of:
 (a) mixing $(SE)Ba_2Cu_3O_{7-\delta}$ wherein $\delta$ is between 0.02 and 0.05, and CuO in powdered form and then pressing said mixture into the desired form; and sintering
 the pressed piece under an oxygen atmosphere at a pressure greater than $5 \times 10^6$ Pa at a temperature of about 1000° C.

2. The method of claim 1, wherein SE is an yttrium atom.

3. The method of claim 2, wherein said sintering is carried out in a pure $O_2$ atmosphere.

4. The method of claim 3, wherein 0.05, and $(SE)Ba_2Cu_3O_{7-\delta}$ and CuO are present in a stoichiometric ratio.

5. The method of claim 1, wherein the pressed piece is heated at a rate of 5°/min, is held about 20 hr at the sintering temperature and a pressure of about $4 \times 10^7$ Pa, and then is cooled at a rate of about 2°/min.

* * * * *